(12) United States Patent
Ojalvo

(10) Patent No.: US 7,882,073 B1
(45) Date of Patent: Feb. 1, 2011

(54) BACKUP AGENT FOR DYNAMICALLY DECOMPOSING A DATABASE BACKUP REQUEST TO CONSTITUENT FILES TO FACILITATE BACKUP RESTARTABILITY

(75) Inventor: Howard Ojalvo, Shoreview, MN (US)

(73) Assignee: Symantec Operating Corporation, Mountain View, CA (US)

( * ) Notice: Subject to any disclaimer, the term of this patent is extended or adjusted under 35 U.S.C. 154(b) by 435 days.

(21) Appl. No.: 11/930,452

(22) Filed: Oct. 31, 2007

Related U.S. Application Data

(60) Provisional application No. 60/976,262, filed on Sep. 28, 2007.

(51) Int. Cl.
*G06F 17/044* (2006.01)

(52) U.S. Cl. ............ 707/654; 707/640; 707/645; 707/646; 707/647; 707/651; 707/652; 707/653

(58) Field of Classification Search ............ 707/644, 707/649, 652, 653, 654

See application file for complete search history.

(56) References Cited

U.S. PATENT DOCUMENTS 5,754,782 A * 5/1998 Masada ............... 709/213
6,035,412 A * 3/2000 Tamer et al. ............ 714/6

(Continued)

OTHER PUBLICATIONS

"Best Practices for Highly Available HP Integrity Servers and Microsoft SQL Server"; Nov. 2006; Hewlett-Packard.*

(Continued)

*Primary Examiner*—Khanh B Pham
*Assistant Examiner*—Sheryl Holland
(74) *Attorney, Agent, or Firm*—Meyertons Hood Kivlin Kowert & Goetzel, P.C.; Jeffrey C. Hood

(57) ABSTRACT

A method for performing backup operations while avoiding data loss due to backup failure. A backup agent software receives a database server backup request and decomposes the backup request into a plurality of smaller backup requests. The plurality of smaller backup requests are then performed on the database to backup the specified database components to an archive. The backup agent software monitors success (or failure) of each of the plurality of backup requests and generates backup scripts for those backup requests that failed. These backup scripts may be subsequently executed to "rerun" the failed backups. The backup agent software is a modular program separate from the client application and the database server software.

16 Claims, 3 Drawing Sheets

U.S. PATENT DOCUMENTS

| | | | |
|---|---|---|---|
| 6,338,146 | B1 | 1/2002 | Johnson et al. |
| 6,374,267 | B1 | 4/2002 | Tam |
| 6,560,617 | B1 * | 5/2003 | Winger et al. ............... 707/640 |
| 6,694,341 | B2 * | 2/2004 | Otsuka et al. ............... 707/640 |
| 6,980,999 | B1 * | 12/2005 | Grana .................... 707/104.1 |
| 6,999,978 | B2 | 2/2006 | Frank et al. |
| 7,107,292 | B1 * | 9/2006 | Hrle et al. .................. 707/202 |
| 7,177,887 | B2 * | 2/2007 | Yang et al. ................. 707/640 |
| 7,191,360 | B2 | 3/2007 | Lee |
| 7,266,574 | B1 | 9/2007 | Boudrie et al. |
| 7,383,287 | B2 | 6/2008 | Ellison et al. |
| 7,389,314 | B2 | 6/2008 | Kulkarni et al. |
| 7,403,987 | B1 | 7/2008 | Marinelli et al. |
| 2003/0009707 | A1 * | 1/2003 | Pedone et al. ................. 714/5 |
| 2004/0107125 | A1 * | 6/2004 | Guheen et al. ................. 705/7 |
| 2007/0061441 | A1 * | 3/2007 | Landis et al. ............... 709/224 |
| 2007/0185922 | A1 * | 8/2007 | Kapoor et al. ............. 707/202 |
| 2008/0016123 | A1 * | 1/2008 | Devraj et al. ............... 707/200 |
| 2008/0216089 | A1 * | 9/2008 | Jia et al. .................... 719/312 |
| 2010/0094807 | A1 * | 4/2010 | Farlee et al. ............... 707/640 |
| 2010/0138393 | A1 * | 6/2010 | Crescenti et al. ........... 707/652 |

OTHER PUBLICATIONS

Reilly, Douglas; "Managing Database Changes"; May 11, 2005; www.simple-talk.com/SQL/backup-and-recovery.*

Brewer, William; "Database High-Availability: Soup to Nuts"; May 31, 2007; www.simple-talk.com/SQL/backup-and-recovery.*

White, Allen; "Automate your Database Integrity Checks using SMO", Sep. 15, 2007; www.simple-talk.com/SQL/backupand-recovery.*

White, Allen; "Alert-Based Transaction Log Backups—Automate Your Database Maintenance Part 2"; Apr. 20, 2007; www.simple-talk.com/SQL/backup-and -recovery.*

Rivett, Pop; "Restoring SQL Databases"; Sep. 28, 2008; www.simple-talk.com/SQL/backup-and-recovery.*

"Introducing ConvTek", Apr. 10, 2006, ConvTek.*

"DASD Backup Superviser", 2006, OpenTech System, Inc.*

P. Rivett, "Restoring SQL Databases"; Sep. 28, 2006, www.simple-talk.com/SQL/Backup-and-recovery.*

R. Balaji et al., "National Business Center atthe Department of the Interior: RMAN Improves BAckup and Recovery Efficiency in a Multi-platform, Multi-application Environment", Dec. 2006, ORACLE.*

"Improving the Cost, Relieability, and Responsiveness of Your Backup and Recovery Infrastructure", Jul. 2006, Hitachi.*

"IBM OS 390—MVS JCL Reference", 2000, IBM, Inc.*

"IBM ICF Catalog Backup and Recovery—Catalog Recovery Plus", Dec. 2006, IBM, Inc.*

"Restartable Backups"; Oracle Database Backup and Recovery Advanced User's Guide; 10g Release 2 (10.2); Oracle; 2003-2005; retrieved from Internet: http://download-east.oracle.com/docs/cd/B19306_01/backup.102/b14191/rcmconc1009.htm#i1008543; 2 pages.

* cited by examiner

BACKUP AGENT FOR DYNAMICALLY DECOMPOSING A DATABASE BACKUP REQUEST TO CONSTITUENT FILES TO FACILITATE BACKUP RESTARTABILITY

PRIORITY CLAIM

This application claims benefit of priority of U.S. provisional application Ser. No. 60/976,262, titled "Backup Agent for Dynamically Decomposing a Database Backup Request to Constituent Files to Facilitate Backup Restartability", filed Sep. 28, 2007, and whose inventor is Howard Ojalvo and which is hereby incorporated by reference in its entirety as though fully and completely set forth herein.

BACKGROUND OF THE INVENTION

1. Field of the Invention

The present invention relates generally to backup software, and more particularly relates to techniques for avoiding data loss due to backup failure.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments. Thus many organizations utilize large databases which may be implemented using various different types of storage devices.

Any one of a variety of failures, such as system crashes, hardware storage device failures, and software defects, may potentially lead to a corruption or a loss of critical data in such environments. In order to recover from such failures, various kinds of backup techniques may be employed. Traditionally, backup images of critical data may have been created periodically (e.g., once a day) and stored on non-volatile storage devices, such as tape devices. Various companies offer backup software for backing up data, such as Veritas Net-Backup, Computer Associates ARCserve, Legato Networker and Oracle RMAN (Recovery Manager).

A backup failure occurs when the backup software fails to create a complete backup of the target database being backed up. In many instances an unacceptable data/work loss occurs due to backup failure. One solution to backup failure is for the backup administrator to create detailed scripts to complete a failed backup. However, oftentimes backup administrators lack the time, training, and/or ability to craft an ad hoc solution to a backup failure.

Therefore, improved methods are desired for minimizing the effects of backup failure.

SUMMARY OF THE INVENTION

Embodiments of the invention relate to a method for performing backup operations while avoiding data loss due to backup failure. First, a database server backup request to back up a database server is generated, e.g., by a client application or an end-user operation. The backup request identifies a database (or a plurality of databases) for backup, wherein the database comprises a plurality of database components and may be quite large. The database server backup request is received by a backup agent software. The backup agent software is a modular program separate from the client application and the database server software.

The backup agent software decomposes the database server backup request into a plurality of smaller backup requests, wherein each of the plurality of smaller backup requests corresponds to one or more the database components in the original backup request.

The backup agent software provides the plurality of backup requests to the database server software or other software for execution. The plurality of backup requests are then performed on the database to backup the specified database components to an archive.

The backup agent software monitors success (or failure) of each of the plurality of backup requests, e.g., as they are performed. In response to this monitoring, the backup agent software may determine a set of the plurality of backup requests that failed. The backup agent software then generates one or more backup scripts for the set of the plurality of backup requests that failed. These backup scripts may be subsequently executed to "re-run" the failed backups, i.e., to perform backups on at least a subset of the set of the plurality of backup requests that failed. The backup scripts may be automatically started, i.e., started by software (e.g., the backup agent) without manual user input required to start the backup scripts. In other embodiments, the backup scripts may be started manually, e.g., by a user supplying a command that directs the backup software to re-execute the backup scripts, i.e., to re-execute the failed backups.

BRIEF DESCRIPTION OF THE DRAWINGS

A better understanding of the present invention can be obtained when the following detailed description of the preferred embodiment is considered in conjunction with the following drawings, in which.

Figure 1:
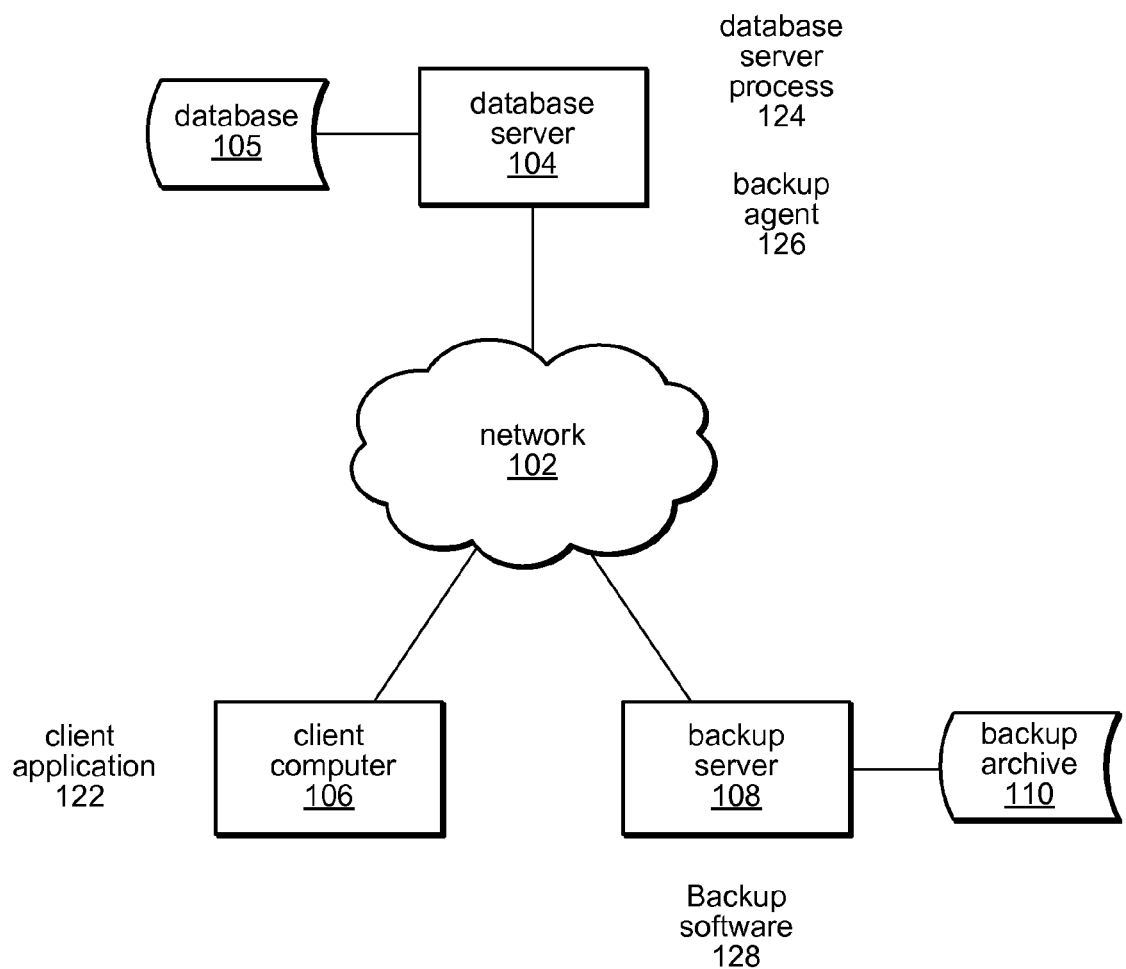
FIGS. 1 and 2 each illustrate an exemplary database system that may implement an embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1—Exemplary Database System

FIG. 1 illustrates an exemplary database system 100 according to one embodiment of the invention. As shown, the database system 100 may include a network 102, a database server computer system 104 and database 105, a client computer system 106, and a backup server 108 and corresponding backup archive 110. The database server 104, the client computer 106, and the backup server 108 may be coupled to the network 102.

The database server computer system 104 may comprise or be coupled to the database 105. In other words, the one or more storage devices forming the database 105 may be part of the database server 104 or may be separate from and coupled to the database server 104. In a similar manner, the backup archive 110 may be comprised in the backup server 108 or may be separate storage.

A client application 122 executes on the client computer 106. Database server software 124 is stored on and executes on the database server 104. The database server software 124 manages operations of the database server 104 and/or database 105. Backup software 128 is stored on and executes on the backup server 108. The backup software 128 may perform various backup operations to back up (e.g., create copies of) software stored on the database server 140. In other words, the backup software 128 may operate to periodically copy data from the database 105 to the backup archive 110, referred to as a backup. In one embodiment, the backup server 108 (and optionally backup archive 110) may be implemented in the client computer 106, or vice versa.

A backup agent software 126 preferably runs on the database server 104. As discussed further below, the backup agent software 126 operates to receive backup requests from the client application 122 (or from the backup software 128, which may be considered a type of client application). The backup agent software 126 operates to split a large backup request into a plurality of smaller backup requests, and monitor completion of these smaller backup requests.

The backup agent software 126 is preferably a modular software program that is separate from the client application 122, the backup software 128, and the database server program 124. The backup agent software 126 is capable of being used with various types of databases, including SQL, DB2, Oracle, and others.

Figure 2:
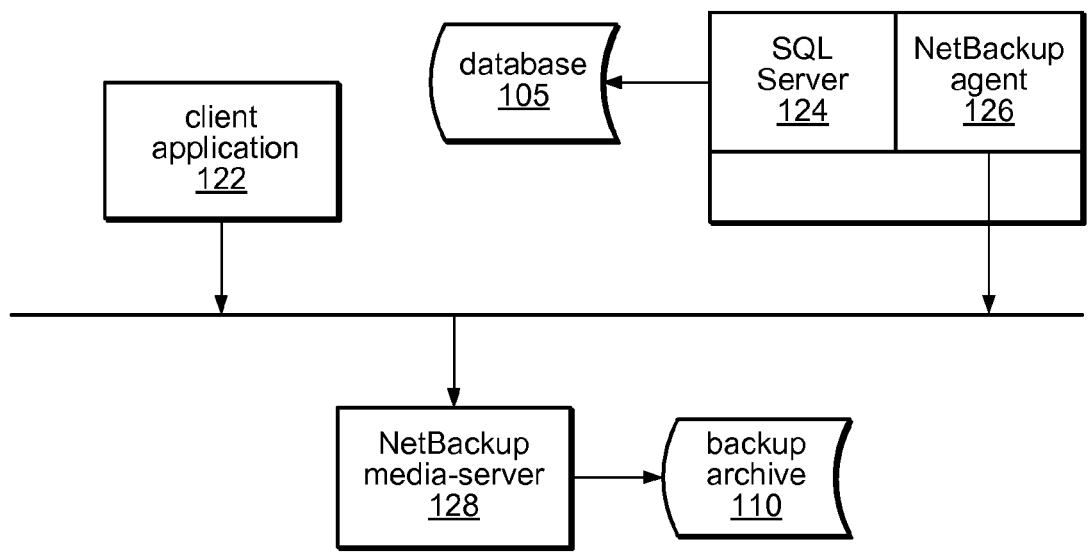

FIG. 2 illustrates the exemplary database system 100 of FIG. 1. As shown in FIG. 2, the database server program 124 may be, for example, a Microsoft SQL Server program, or other type of database server program. The backup software 128 may be referred to as NetBackup media-server software, e.g., from SYMANTEC Corporation. The backup agent software 126 may be referred to as the NetBackup agent 126.

Figure 3:
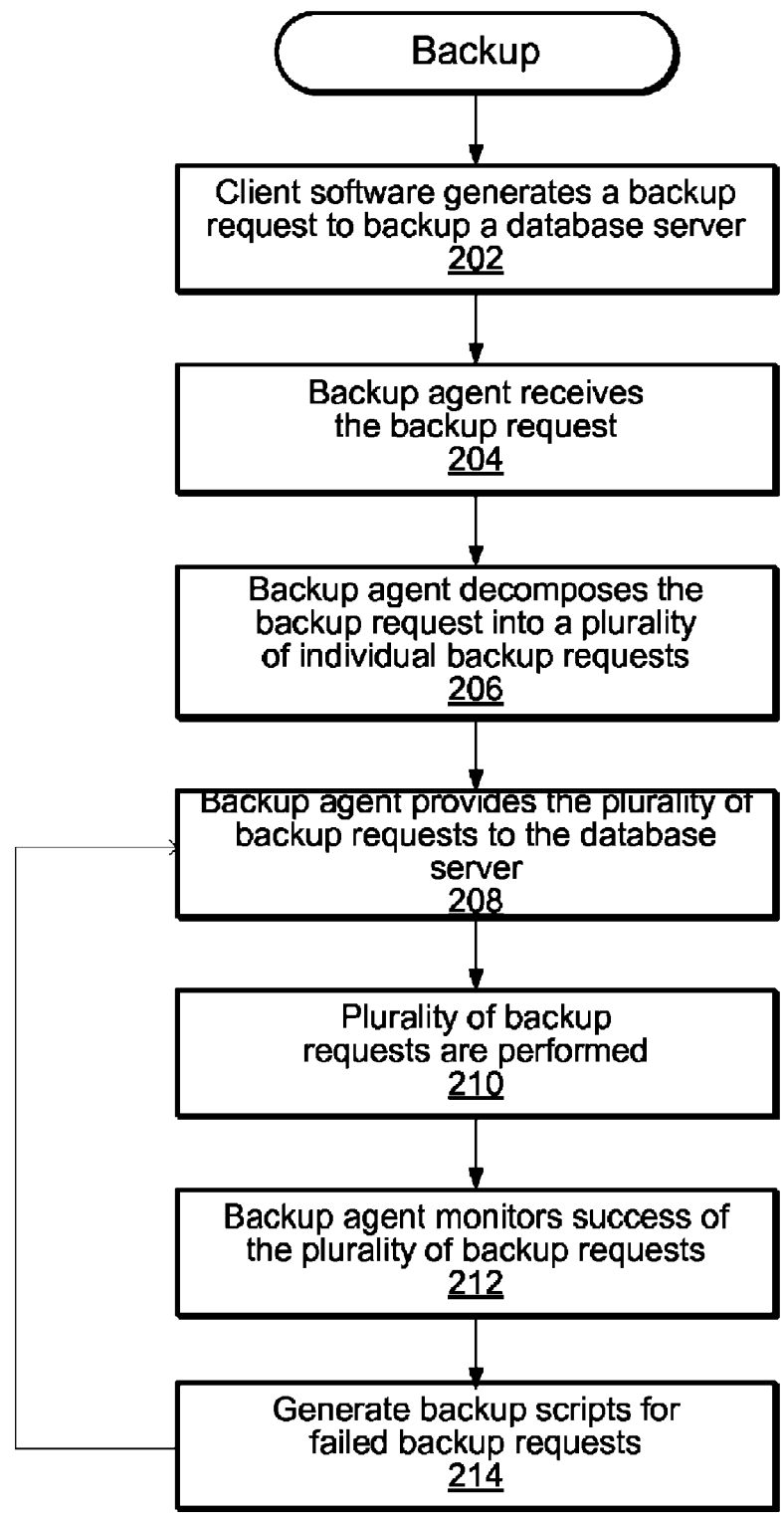
FIG. 3 is a flowchart diagram illustrating operation of one embodiment of the method of the present invention.

FIG. 3—Flowchart Diagram

FIG. 3 is a flowchart diagram illustrating operation of one embodiment of the invention. The flowchart of FIG. 3 illustrates one exemplary embodiment, and it is noted that other embodiments of the invention may be used to implement the invention as claimed herein.

At 202 the client application 122, or an end user, generates a database server backup request to backup a target device, e.g., a database 105. The backup request identifies a composite object that comprises a plurality of database components. The database components may be a plurality of different files, and may also include one or more file groups. The client application may present a graphical user interface (GUI) on a display. The user may provide input to the GUI in the client application to request backups, wherein the backup requests are made to the backup agent software 126. One example of the client application is a backup scheduler program. In one embodiment, the user may create a program, such as a COBOL program, that executes to provide the backup requests to the backup agent software.

At 204 a backup agent software 126 receives the database server backup request to backup the database server 104. The backup agent software 126 preferably receives the database server backup request from the client application 122, e.g., from the user input provided to the GUI in the client application. As mentioned above, the backup agent software 126 is a modular program separate from the client application 122 and the database server program 124.

At 206 the backup agent software 126 decomposes the database server backup request into a plurality of backup requests. Each of the plurality of backup requests corresponds to a respective one (or more) of the plurality of database components in the original request. Thus the backup agent software 126 takes the original large single backup request and breaks up this large single backup request into a plurality of smaller backup requests. As one example, if the original backup request specified a database having 100 files to be backed up, in 206 the method may break up this request into 100 different backup requests, wherein each backup request was for a particular one of the 100 files. In one embodiment, the user may specify a size (e.g., a minimum or maximum size) of the smaller backup requests that are created.

At 208 the backup agent software 126 provides the plurality of backup requests to the database server software 124.

At 210 the plurality of backup requests are performed on the database server 104. For example, database server software 124 executing on the database server 104 may perform (or attempt to perform) each of the plurality of backup requests. In one embodiment, various ones of the plurality of backup requests may be scheduled for various times.

At 212 the backup agent software 126 monitors success and/or failure of the plurality of backup requests. In other words, the backup agent software 126 may monitor the status of each of the plurality of backup requests, including which requests fail. The monitoring performed by the backup agent software at 212 may determine a set of the plurality of backup requests that failed.

At 214 the backup agent software 126 generates one or more backup scripts (also referred to as restart scripts) for the set of the plurality of backup requests that are determined to have failed. These one or more backup scripts may execute at a later time to perform the backups that previously had failed. The backup script may comprise database server language commands that are executable to perform the backups that have failed. In this embodiment, the backup script comprises backup commands in the database server language of the database server software 124 that are executable by the backup server to perform the failed backups.

In another embodiment, the backup script may comprise commands scripted in another language from which the backup agent software may, during execution of the script, generate on-the-fly database server commands that are executed by the database server to perform the failed backups. In other words, the backup script may contain "first" commands scripted in another language (a language different from the database server language). When the backup agent software executes these first commands, this causes database server commands (commands in the database server language) to be generated. These database server commands may then be executed by the database server to perform the failed backups.

In one embodiment in 214 the backup agent software 126 generates client application restart scripts, i.e., the backup scripts may be created for execution by the client application. The creation of the backup scripts allows these "re-try" backups to be performed for any database server software, regardless of whether the database server software or the backup agent software has any built-in "re-try" capability.

The backup agent software 126 may operate to automatically generate the backup scripts for those backups that have failed, i.e., without user input required to specify or create the backup scripts. Thus the term "automatically" in 214 refers to the backup agent software 126 creating the backup scripts without manual user input required to create them.

In one embodiment, in 214 the backup agent 126 (or other software) operates to automatically launch the backup scripts (restart scripts). The backup scripts are preferably launched as independent backups, where the success or failure of some backups does not affect other backups, and vice versa. The term "automatically" here refers to the backup agent software 126 launching the backup scripts without manual user input required to launch the backup scripts. In other words, the backup agent software 126 starts the backup scripts, or schedules them to start, without the user being required to manually specify the backup scripts or manually start them. This is reflected in FIG. 3 by the arrow drawn from 214 back to 208. The backup agent (or other software) may operate to generate backup scripts and automatically launch them one or more times as needed, until all backups have been successfully performed.

Thus the backup agent 126 decomposes the backup request, whose target may embody a large number of component files, into a plurality of sets comprising its constituent files. These sets are launched for backup independently; and the success or failure of each operation is recorded and made available as input for automatic or assisted generation of a backup script (or restart script).

The agent thus automatically decomposes a database server backup request into multiple finer grained requests for backing up the objects that constitute the backup target. The database server constituent objects may be filegroups and/or files. Therefore, according to one embodiment, a backup request would be decomposed to multiple requests for backing up sets consisting of database server files or filegroups. Preferably the sum of the requests would include all parts of the original backup.

The backup agent also keeps track of the success or failure of the finer grained requests and uses this data to generate (or assist in the generation of) backup (restart) scripts for those sets that failed to be backed up successfully.

Embodiments of the invention thus help to minimize the problem of failed backups, because successful work that is done in smaller units is saved. Further, the method operates to automatically complete unfinished backups without requiring detailed user intervention.

Embodiments of the invention can be applied to any of various types of databases, for example, both types of SQL Server backup, namely, proxy (or snapshot) and standard, as well as other types of databases. The backup agent also allows for adjustment of restart-granularity by varying the size of the backup element sets according to user preferences or other criteria.

Thus, one embodiment of the invention comprises three distinct entities that interact to perform the method described herein:

(a) a client application that makes the request for a backup, (b) a database server that manages the backup target (i.e., databases) and performs certain operations in performance of the backup; and (c) a backup agent software that manages the archived data, receives backup requests from the client application, decomposes or "splits up" large backup requests into a plurality of smaller (more granular) backup requests, monitors completion of these backup requests, and performs additional operations in performance of the backup.

Embodiments of the invention may be used when the target of a backup request is a higher order object like a database or a filegroup that can be decomposed to a plurality of component objects, like filegroups or files. The objects do not have to be specifically these objects. Embodiments of the invention may be used for other types of data management systems where the types of components are different.

As noted above, the backup agent software manages backups for a variety data sources, including Oracle, SQL Server, DB2, etc. The component that decomposes the backup request, the backup agent software, is a distinct module from the database server software.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing backup operations, the method comprising:

receiving a database server backup request to backup a database server, wherein the backup request identifies a plurality of database components for backup, wherein the database server backup request is received from a client application, wherein the database server backup request is received by a backup agent software, wherein the backup agent software is a modular program separate from the client application and database server software;

the backup agent software decomposing the database server backup request into a plurality of backup requests, wherein each of the plurality of backup requests corresponds to respective ones of the plurality of database components;

the backup agent software providing the plurality of backup requests to the database server, wherein the database server is configured to perform the plurality of backup requests;

the backup agent software monitoring success of the plurality of backup requests, wherein said monitoring determines a set of the plurality of backup requests that failed;

automatically generating one or more backup scripts for the set of the plurality of backup requests that failed;

wherein said automatically generating the one or more backup scripts comprises creating first commands, wherein the first commands are not in a database server language, wherein the first commands are executable by the backup agent software to create database server commands in the database server language for performing the set of the plurality of backup requests that failed.

2. The method of claim 1, wherein the backup agent software performs said automatically generating the backup scripts.

3. The method of claim 1, automatically starting the backup scripts, wherein the backup scripts are executable to perform backups on at least a subset of the set of the plurality of backup requests that failed.

4. The method of claim 3, wherein the backup agent software performs said automatically starting the backup scripts.

5. The method of claim 1, wherein the backup agent software is operable to' perform said receiving, said decomposing, and said providing for a plurality of different types of database server.

6. The method of claim 1 wherein the database server is a SQL database server.

7. A non-transitory computer readable memory medium storing program instructions for performing backup operations, wherein the program instructions are executable to:

receive a database server backup request to backup a database server, wherein the backup request identifies a plurality of database components for backup, wherein the database server backup request is received from a client application, wherein the database server backup request is received by a backup agent software;

decompose the database server backup request into a plurality of backup requests, wherein each of the plurality of backup requests corresponds to respective ones of the plurality of database components;

provide the plurality of backup requests to the database server, wherein the database server is configured to perform the plurality of backup requests;

wherein said decomposing and said providing are performed by the backup agent software, wherein the backup agent software is a modular program separate from the client application and the database server software;

monitor success of the plurality of backup requests, wherein said monitoring determines a set of the plurality of backup requests that failed;

automatically generate one or more backup scripts for the set of the plurality of backup requests that failed;

wherein said automatically generating the one or more backup scripts comprises creating first commands, wherein the first commands are not in a database server language, wherein the first commands are executable by the backup agent software to create database server commands in the database server language for performing the set of the plurality of backup requests that failed;

wherein the backup agent software performs said monitoring and said generating.

8. The non-transitory computer readable memory medium of claim 7,
wherein the backup agent software automatically generates the backup scripts.

9. The non-transitory computer readable memory medium of claim 7, wherein the program instructions are further executable to:
automatically start the backup scripts, wherein the backup scripts are executable to perform backups on at least a subset of the set of the plurality of backup requests that failed.

10. The non-transitory computer readable memory medium of claim 9
wherein the backup agent software automatically generates the backup scripts; and
wherein the backup agent software automatically starts the backup scripts.

11. The non-transitory computer readable memory medium of claim 7,
wherein the backup agent software is operable for a plurality of different types of database server.

12. The non-transitory computer readable memory medium of claim 7,
wherein the database server is a SQL database server.

13. A system for performing backup operations, the system comprising:
a memory medium which stores a backup agent software;
a database server operable to receive a backup request to backup the database server, wherein the backup request identifies a plurality of database components for backup, wherein the database server backup request is received by the backup agent software, wherein the backup agent software is a modular program separate from the database server software;
wherein the backup agent software is executable by a processor to:
decompose the database server backup request into a plurality of backup requests, wherein each of the plurality of backup requests corresponds to respective ones of the plurality of database components;
provide the plurality of backup requests to the database server;
wherein the database server is operable to perform the plurality of backup requests;
wherein the backup agent software is further executable to:
monitor success of the plurality of backup request to determine a set of the plurality of backup requests that failed;
automatically generate backup scripts for the set of the plurality of backup requests that failed;
wherein said automatically generating the one or more backup scripts comprises creating first commands, wherein the first commands are not in a database server language, wherein the first commands are executable by the backup agent software to create database server commands in the database server language for performing the set of the plurality of backup requests that failed.

14. The system of claim 13,
wherein the backup agent software is further executable to:
automatically start the backup scripts, wherein the backup scripts are executable to perform backups on at least a subset of the set of the plurality of backup requests that failed.

15. The system of claim 13,
wherein the memory medium is comprised in the database server.

16. The system of claim 13, further comprising:
a client computer coupled to the database server, wherein a client application executes on the client computer, wherein the database server backup request is received from the client application.

* * * * *

UNITED STATES PATENT AND TRADEMARK OFFICE
CERTIFICATE OF CORRECTION

PATENT NO. : 7,882,073 B1  
APPLICATION NO. : 11/930452  
DATED : February 1, 2011  
INVENTOR(S) : Ojalvo Page 1 of 1

It is certified that error appears in the above-identified patent and that said Letters Patent is hereby corrected as shown below:

In the Claims:

Column 6
Claim 5, Line 56, please delete "is operable to' perform" and substitute -- is operable to perform --;
Claim 6, Line 59, please delete "The method of claim 1" and substitute -- The method of claim 1, --.

Column 7
Claim 10, Line 43, please delete "medium of claim 9" and substitute -- medium of claim 9, --.

Signed and Sealed this
Twenty-sixth Day of July, 2011

David J. Kappos
*Director of the United States Patent and Trademark Office*